United States Patent
Meaney

(10) Patent No.: US 7,331,027 B2
(45) Date of Patent: Feb. 12, 2008

(54) METHOD FOR SWAPPING CIRCUITS IN A METAL-ONLY ENGINEERING CHANGE

(75) Inventor: Patrick J. Meaney, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 10/894,664

(22) Filed: Jul. 20, 2004

(65) Prior Publication Data

US 2006/0031796 A1    Feb. 9, 2006

(51) Int. Cl.
*G06F 17/50*    (2006.01)
(52) U.S. Cl. .................... 716/11; 716/8; 716/9; 716/10
(58) Field of Classification Search ............... 716/8–11
See application file for complete search history.

(56) References Cited

U.S. PATENT DOCUMENTS

| | | | | |
|---|---|---|---|---|
| 5,396,435 A | * | 3/1995 | Ginetti ........................ | 716/6 |
| 5,555,201 A | * | 9/1996 | Dangelo et al. ............... | 716/1 |
| 5,764,525 A | * | 6/1998 | Mahmood et al. ............ | 716/18 |
| 5,781,446 A | * | 7/1998 | Wu ............................... | 716/9 |
| 6,145,117 A | * | 11/2000 | Eng ............................. | 716/18 |
| 6,255,845 B1 | * | 7/2001 | Wong et al. ................... | 326/38 |
| 6,272,668 B1 | * | 8/2001 | Teene ........................... | 716/10 |
| 6,286,128 B1 | * | 9/2001 | Pileggi et al. ................ | 716/18 |
| 6,480,815 B1 | * | 11/2002 | Olson et al. .................. | 703/14 |
| 6,499,129 B1 | * | 12/2002 | Srinivasan et al. ........... | 716/4 |
| 6,651,239 B1 | * | 11/2003 | Nikitin et al. ................ | 716/18 |
| 6,922,817 B2 | * | 7/2005 | Bradfield et al. ............. | 716/1 |
| 7,089,143 B2 | * | 8/2006 | Foreman et al. ............. | 702/125 |
| 2003/0229875 A1 | * | 12/2003 | Smith et al. ................. | 716/10 |

* cited by examiner

*Primary Examiner*—Thuan Do
*Assistant Examiner*—Naum Levin
(74) *Attorney, Agent, or Firm*—Lynn L. Augspurger

(57) ABSTRACT

A method is disclosed for improving design criteria and importantly timing criteria following a metal-only engineering change. The method involves making initial logical changes involving new books (gate-level, filler-cell circuits, called 'eco books'), running placement and routing with the new books, and timing the resulting logic. If there are timing violations, existing, non-filler books which are in close proximity are considered for swapping with the eco books. The book swaps are all done with wire connections only (i.e. the book placements are not affected). This way, critical paths and non-critical paths can be traded-off to achieve a faster design, even though books are not allowed to be moved. Some simple algorithms are discussed; however, there are many heuristic and analytic algorithms that can be applied in choosing swaps, based on the needs of the particular design.

12 Claims, 5 Drawing Sheets

FIGURE 8:

```
         801       802       803       804              805       806
          ↓         ↓         ↓         ↓                ↓         ↓
       Incumbent  Func      Slack     Best candidate   Slack     Distance  Comments
       ---------------------------------------------------------------------------
       mec31_i1062  invert  -243  <->  xbox23632         353      52 uM
       mec31_i1044  nand2   -243  <->  xbox23110         381      16 uM
       mec31_i1043  nand2   -243  <->  xbox23001         343      10 uM
       mec31_i1036  nor2    -243  <->  xbox22273         676     228 uM  DIST!
       mec31_i1038  nand3   -243  <->  xbox20706         313     144 uM
       mec31_i1063  invert  -238  <->  xtdc_crit_fan1    214      21 uM
       mec31_i1042  nand2   -238  <->  xbox23001         343       3 uM
       mec31_i1032  nor3    -228  <->  xbox22245         774     568 uM  DIST!
       mec31_i1028  invert  -175  <->  xtdc_crit_fan2   9999       3 uM
       mec31_i1017  nand3   -175  <->  xbox28012         278     194 uM
       mec31_i1015  nor2    -175  <->  xbox22436         358     336 uM  DIST!
       mec31_i1020  nand2   -175  <->  xbox20453        1092      12 uM
       mec31_i1058  invert  -175  <->  xbox19628        1111      75 uM
       mec31_i1035  nor2    -169  <->  xbox21527        1276     151 uM
       mec31_i1011  nor3    -166  <->  xbox22262         524      81 uM
       mec31_i1054  invert  -159  <->  xfaninv14774     9999      73 uM
```

METHOD FOR SWAPPING CIRCUITS IN A METAL-ONLY ENGINEERING CHANGE

CROSS-REFERENCE TO RELATED APPLICATIONS

Trademarks

IBM® is a registered trademark of International Business Machines Corporation, Armonk, N.Y., U.S.A. and other names used herein may be registered trademarks, trademarks or product names of International Business Machines Corporation or other companies.

BACKGROUND OF THE INVENTION

1. Field of the Invention

This invention relates to swapping circuits in a metal-only, engineering change only (ECO) process using wire swaps to allow for better slews and timing.

2. Description of Background

This invention relates to an engineering change only (ECO) process where timing and slews can be improved by effectively swapping similar circuits using wiring changes. Typically, in IBM's engineering processes wire-only changes are used to make minor tweaks to a chip design by keeping all the silicon masking while changing the wire masks in the chip fabrication process.

In fact, even logic circuits can be created with metal, provided special 'filler cells' are used. These filler cells contain un-customized transistors. By connecting up these transistors in the right way, different logical functions can be created (i.e. NAND3, OR2, Inverter, etc.).

This way, wafers can be created in large quantities up through the wire customization steps. Then, if new problems are detected in the design, the design fixes can be made simply using wire changes that get applied to make new masks to apply to the existing sub-stock. The effect is a quicker chip fabrication from the last detected problem/fix until chip availability.

One problem with metal-only engineering changes is that the metal-customized filler cell gates are generally not as fast as original silicon gates due to the limitation of making the filler cells growable. Also, it is difficult to provide all the flavors of filler-cell books (due to high cost of design and modeling efforts) and there is a likelihood that some of these books would never get used. There may also not be enough contiguous space for some of the larger books required in an engineering change since much of the space may have already been used up.

It would be desirable to have a way to design using filler cells that were just as good as original silicon books due to the cost of modeling efforts. Also, if a new path becomes the most critical path in an area, it would be nice to have the flexibility of re-choosing which circuits get used for which applications to achieve the same function with better performance.

SUMMARY OF THE INVENTION

This invention provides a way for making wire-only design changes while maintaining or improving system path performance. In accordance with the preferred embodiment, the engineering changes are made using any current engineering change method. The changes can be fully placed and wired, or simply placed with wire estimates. Then, the design is exercised to determine if there are any design violations. If so, the invention can be invoked. In the preferred embodiment using a design exercised by timing, a determination is made if there are any slew and/or slack timing violations. A replacement candidate is selected and the violation replaced by the processed described in detail below.

Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 8 illustrates incumbent/candidate table with distances.

The detailed description explains the preferred embodiments of the invention, together with advantages and features, by way of example with reference to the drawings.

DETAILED DESCRIPTION OF THE INVENTION

The first step of the invention is to use the timing model to classify all books in the design. First, they are classified by pin-compatible function (e.g. NAND3, NOR2, AOI22, etc.) and put on the appropriate list as potential 'candidates' for swapping. Next, they are analyzed for original slack (i.e. slack of the worst path each book is involved in), gain, beta ratio (or any other parameter that will be used for book swap selection). These properties are associated with the books (i.e. through an associated list or look-up table).

Then, the timing model is analyzed to determine which books (circuits) are contributing to the timing problems. These could be books that are slow, have poor gains, cause bad slews, have poor locations, etc. These books to be replaced are referred to as 'incumbent' books.

The invention then calls for the 'BEST replacement' candidate to be chosen for each incumbent. Distance can be factored in as well as slack, gain, and slew. Swaps are made between incumbents and candidates. Then, the model is re-timed.

Results of the preferred embodiment did not require any reiteration of the invention, although that could certainly be done.

Figure 1:
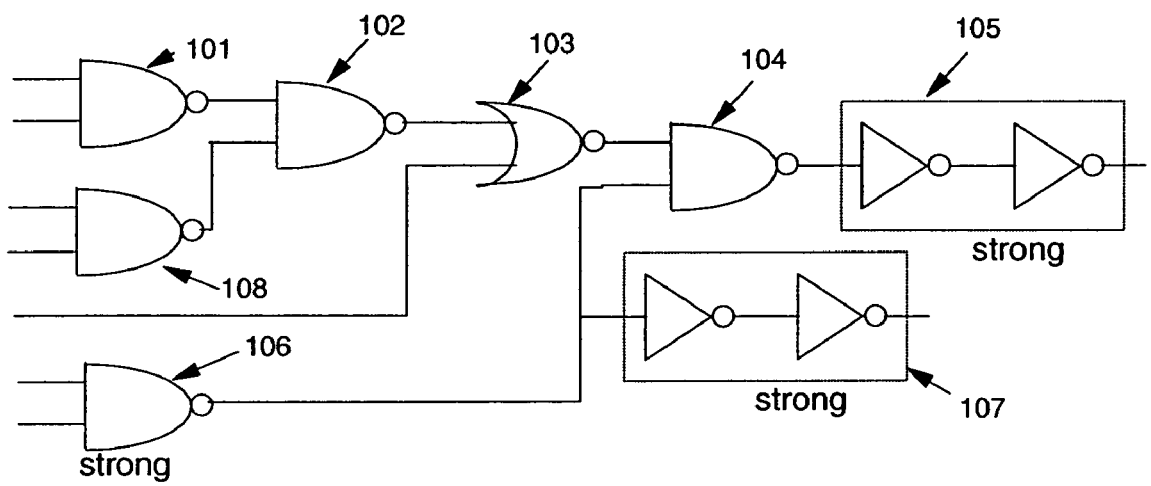
FIG. 1 illustrates the prior art for an original circuit design.

In order to understand the invention in more detail, it is important to review the engineering change metal-only (ECO) process. Turning to FIG. 1, notice that there is an original logic circuit design. In this design, there are NANDs, NORs, and Buffers (made up of double-invertors). However, there can be any number or type of logic gates. In this example, NAND2 gate, 101, and NAND2 gate, 108, have outputs connected to inputs of NAND2 gate, 102, whose output is connected to input of NOR2 gate, 103. Another input is connected directly to input of said NOR2 gate, 103. Said NOR2 gate, 103, has output connected to NAND2 gate, 104, whose output is connected to input of BUFFER gate, 105. NAND2 gate, 106, has output connected to input of buffer gate, 107, and input of said NAND2 gate, 104. This figure represents an example of an original circuit, prior to any metal-only EC design.

Figure 2:
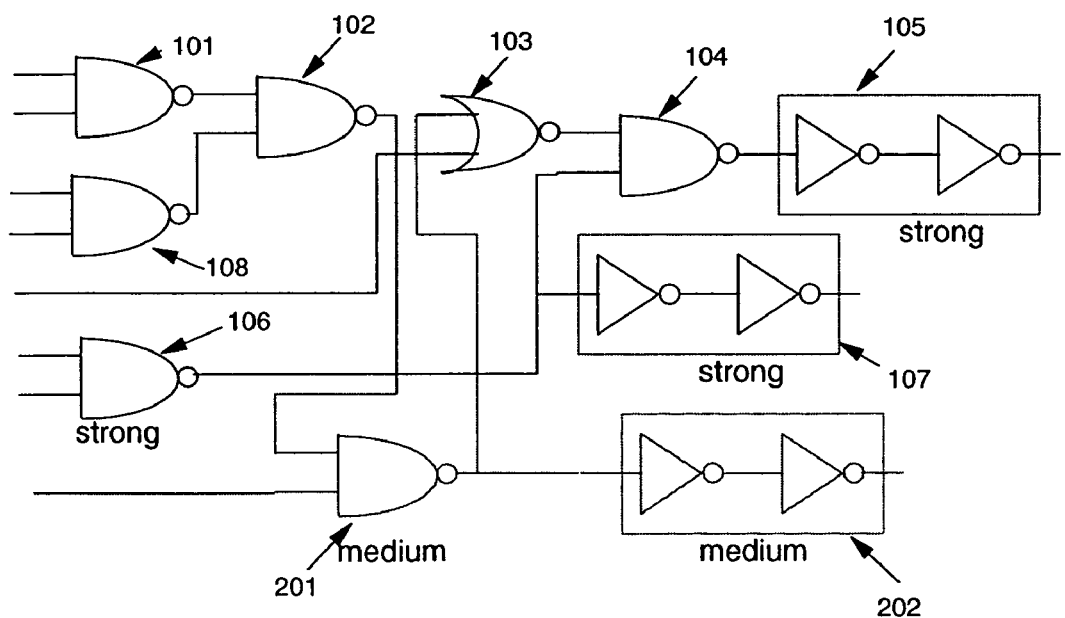
FIG. 2 illustrates the prior art for a wire-only change to an original circuit design.

There are times when a logical change is needed to enhance a function or fix a design. FIG. 2 represents a metal-only engineering change to the design in FIG. 1. Notice in FIG. 2 there is an additional input connected to input of new NAND2 gate, 201 instead of to original input of said NOR2 gate, 103. The output of NAND2 gate, 102, is now connected to input of said new NAND2 gate, 201. Output of said new NAND2 gate, 201, is connected to same original input of said NOR2 gate, 103. The output of said new NAND2 gate, 201, is also connected to input of new BUFFER gate, 202, whose output is used for some new function.

Figure 3:
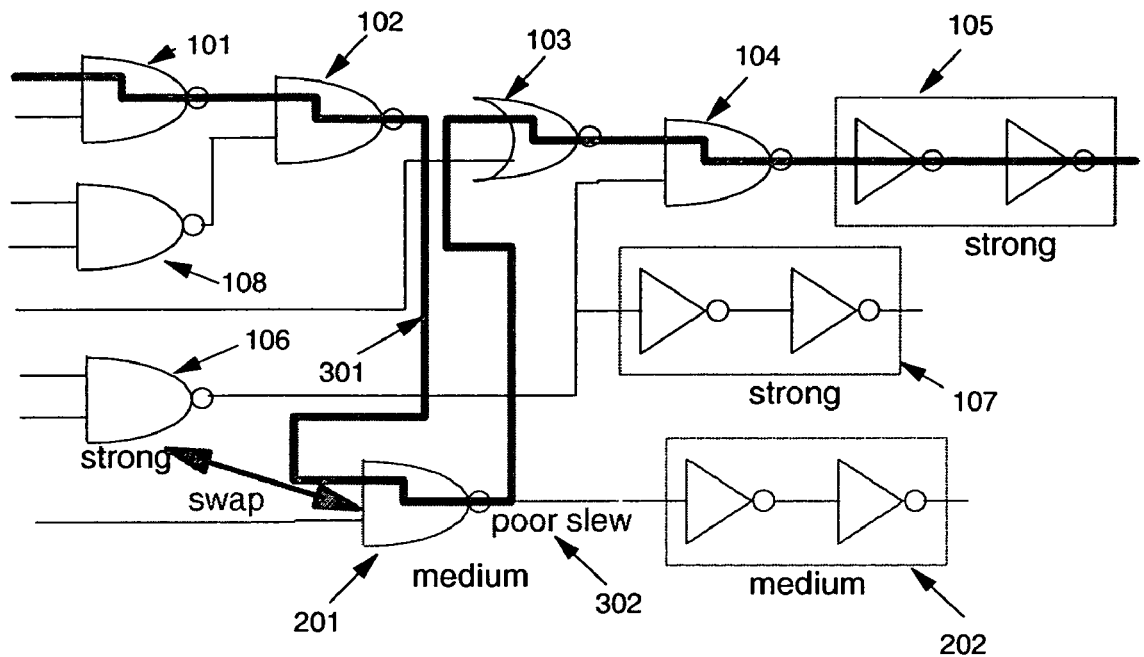
FIG. 3 illustrates the first timing problem and the first swap.

Turning to FIG. 3, notice there is a new critical timing path, 301, (for the logic described with FIG. 2) that did not exist in FIG. 1. This path, propagates through NAND2, 101, NAND2, 102, NAND2, 201, NOR2, 103, NAND2, 104, and BUFFER, 105. Suppose this path is critical because of a bad slew introduced at the output of new NAND2 gate, 201, observed at the poor slew net, 302. In the prior art, the only way to fix this problem with a metal-only fix is to change the power levels of new NAND2, 201, or new BUFFER, 202, or to find a different set of filler cells to accomplish better timing results. Often, there is a limitation to the types of metal-only filler cell books that can be customized to solve this problem.

The current invention allows for a solution that can improve timing tremendously. In this simple example in FIG. 3, it would be beneficial to swap NAND2, 106, and NAND2, 201, because NAND2, 106, is a stronger book (i.e. has more gain), and could likely solve the bad slew problem on bad slew net, 302. The only major restriction is that after the swap, it is important that the new NAND2 gate, 201, does not break the timing of the path involving NAND2 gate, 106. This means that the original slack, slew, gain, and location of these gates may be needed to ensure paths do not get worse.

Please note that there are many algorithms that could be chosen to select which books to swap. These swaps could all be determined for the entire design and then all applied at once. The swaps could also be done incrementally (i.e. one at a time) and the design re-timed after each swap. The algorithm could also involve substituting every possible equivalent book in a greedy algorithm and saving the best swap for each case.

The preferred embodiment was implemented with a program (a perl script). The following parameters were used by the program:

| Parameter | Default | Description |
| --- | --- | --- |
| RADIUS | 200 um | Any book that is greater than this distance from the incumbent will not be considered as a candidate. This 'distance' is the equivalent wire distance of the two books. Book 1: (x1, y1), Book 2: (x2, y2). Distance = abs(x2 − x1) + abs(y2 − y1) <= RADIUS to be considered. |

-continued

| Parameter | Default | Description |
| --- | --- | --- |
| PSLACK | 200 ps | Candidates must have more than this positive slack to be considered for a swap. This is to protect the previous circuit from getting harmed by the metal-only book after a swap. |
| NSLACK | 50 ps | Incumbents with a slack that is less than this number are considered for swap to improve their slack. Using a slightly positive number can help to improve the slack past zero (the target). |
| NSLEW | 150 ps | Incumbents with a slew greater than this value will be considered for a swap. The slack and slew targets can be tweaked to get the best filter. There can also be a manual list generated for which books to choose as incumbents, if necessary. |
| NDLY | 50 ps | Sometimes, the book delay can be used to see that there are problems with an ECO book. |
| MINPOWER | 6 | Do not even consider candidates whose power is not great than this number. This is very much dependent on the technology. For the preferred embodiment, this number represented a large power level that could handle large fanout and slews. |

In the preferred embodiment, new NAND2 gate, 201 would be the incumbent gate. Suppose its slack is −120 ps and its physical location is x, y (microns from origin). Its slew is 300 ps and its delay is 210 ps. With a technology whose slews should be less than 100 generally, the 300 is extreme. This is a good indication that the book does not have enough gain for the surrounding circuits. Therefore, it would be selected as an incumbent. Suppose NAND2 gate, 106, has a slack of +520, a power level of 8, and is at physical location x+80, y−40. This equates to a distance of 80+40=120 um from the incumbent, new NAND2 gate, 201. Since the distance, 120 um, is less than RADIUS=200 um, the power 8 is greater than MINPOWER=6 and the original slack +520 is greater than PSLACK=200, this is a candidate. Assuming the 120 um is the closest book, this candidate would be the best choice.

Figure 4:
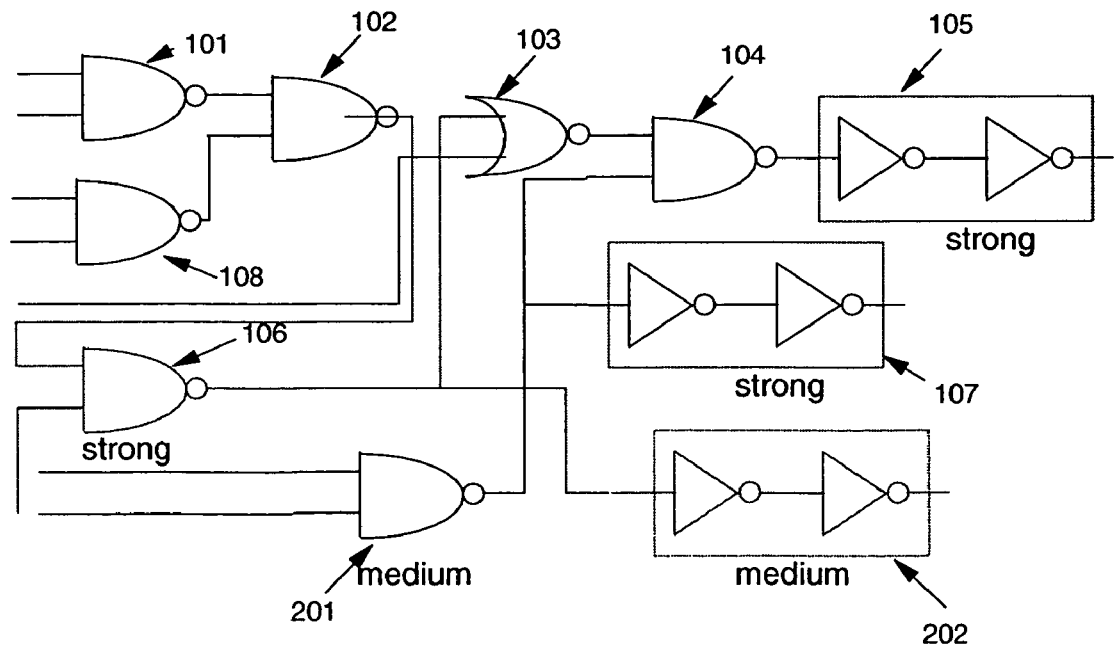
FIG. 4 illustrates the results after the first swap.

In FIG. 4, NAND2 gate, 106, and NAND2 gate, 201, have been swapped from the new design shown in FIG. 3.

Figure 5:
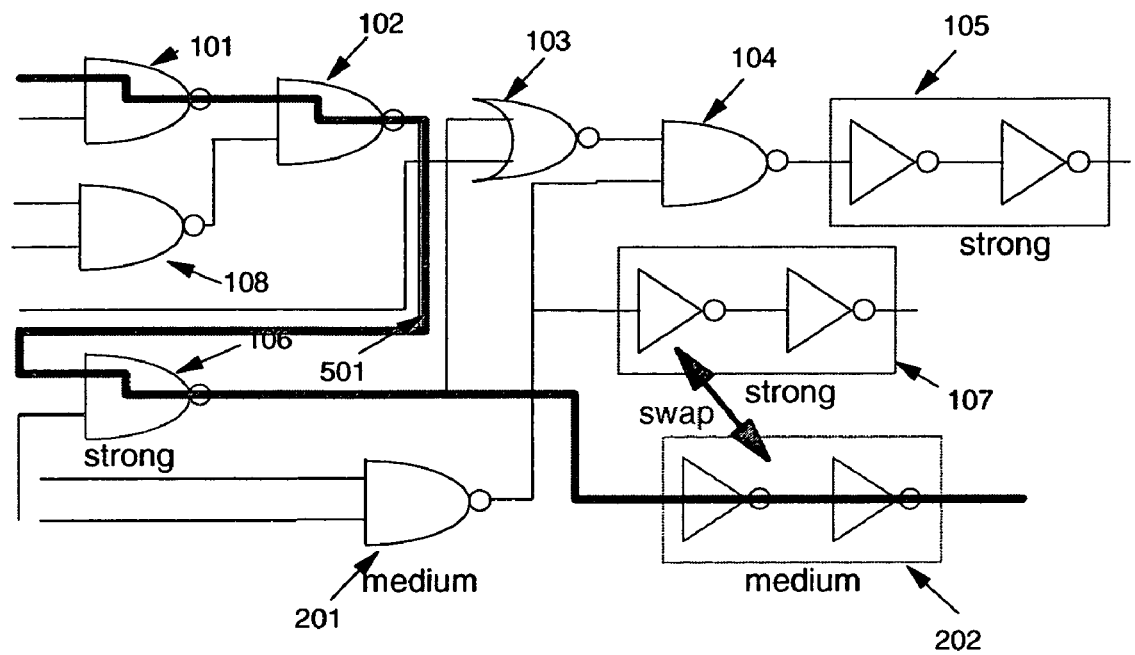
FIG. 5 illustrates the second timing problem.

Turning to FIG. 5, notice that there may be another critical timing path, 501, that is better than the new critical timing path, 301, but still needs further fixes. In this case, the new BUFFER gate, 202, is not strong enough to feed whatever logic it connected to before. However, BUFFER gate, 107, seems to have a stronger gain and is located nearby. The invention would once again comparing slews, gains, slacks, and locations of these books. Assume a swap is determined to improve the design.

Figure 6:
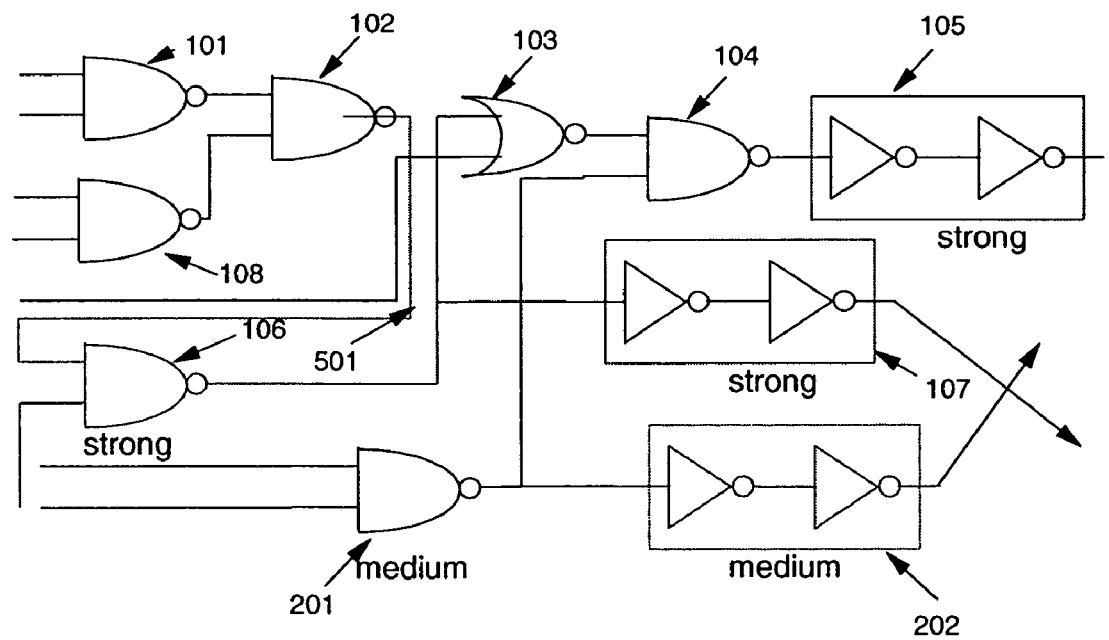
FIG. 6 illustrates the results after the second swap.

FIG. 6 shows the resulting circuit after BUFFER gate, 107, is swapped with new BUFFER gate, 202.

Figure 7:
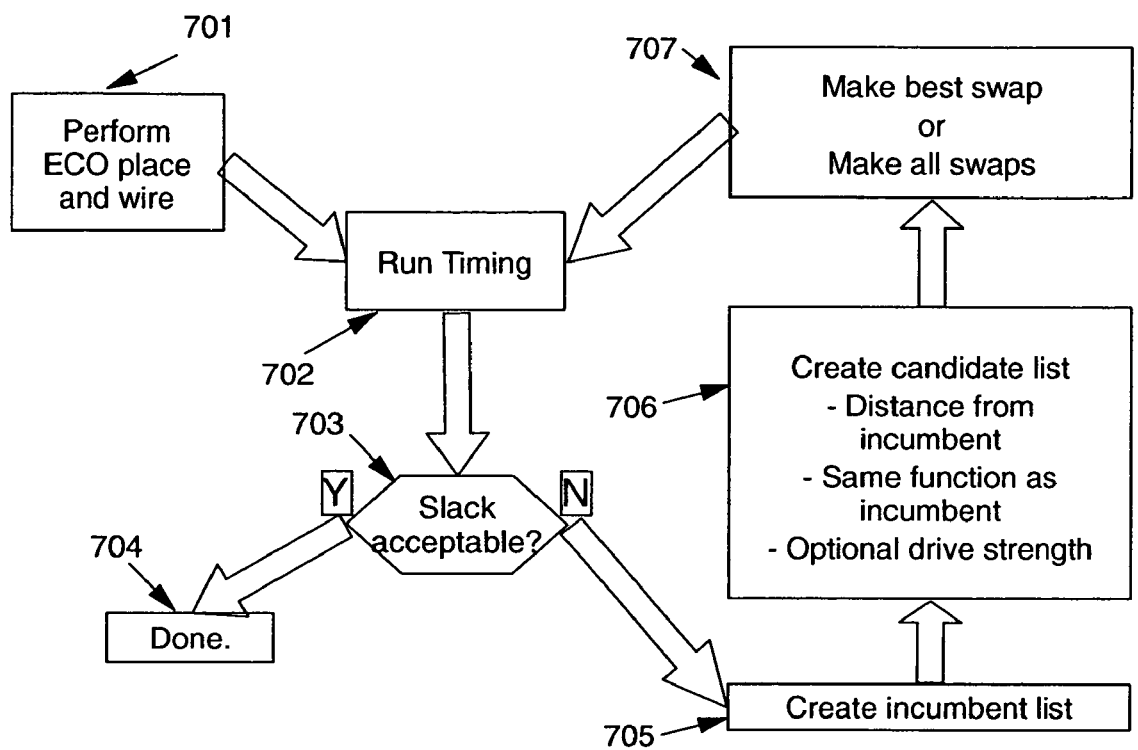
FIG. 7 illustrates the high-level process of the invention.

Turning to FIG. 7, notice that the invention makes use of the prior art. For the prior art, the first step is to change the design and perform the ECO place and wire, 701. This ensures there are only wire changes made to the design. The next step is to run timing on the design, 702. The timing is checked, 703. If the timing is acceptable, the ECO task is done, 704. However, if the design does not meet timing, there was no adequate alternative. The design would need to be re-worked manually and the process repeated from steps 701 through 704.

This invention allows for further automatic changes to the design. After the slack is determined to be unacceptable, 703, the invention allows the step of creating an incumbent list, 705. This consists of filtering all books out of the design that have poor slews, slack, etc. These are typically the new filler cell gate array books, but could also be any other books in the original design that have timing problems.

The next step is to create a candidate list, 706. This can be accomplished in many ways. The preferred embodiment uses a perl program to create a linked list for all books of each type. Pre-filtering of this list is done for speed (i.e., only books with a power level greater than MINPOWER=6, slack>PSLACK, etc. are added to the table). Each book also has an associate list with properties of placement, slack, slew, gain, book type, etc. For each incumbent, the book type is extracted. The linked list for that type book is traversed. For each book, the distance is calculated and any additional filtering could be done as well (i.e. slack, slew). All books that qualify are added to a table of possible substitutions, but the closest book is also added to a FINAL list of swaps. The program can output JUST the FINAL swaps or the list of all possible swaps.

The next step is the make the best swap for each book, 707. The preferred embodiment is a perl script which runs outside the timing environment. It is fast and will determine all the swaps in less than a minute. However, it is also possible to have the program run in an incremental timing environment and determine just the first swap. The swap can then be made, the results analyzed, and the program come up with the next swap. Care has to be taken to keep the program from looping on the same group of swaps.

Once the swaps are made, 707, timing is run again, 702, and the slacks reanalyzed, 703. If the slacks are acceptable, the design is done, 704. If not, the process can be iterated again with different parameters.

While the preferred embodiment to the invention has been described, it will be understood that those skilled in the art, both now and in the future, may make various improvements and enhancements which fall within the scope of the claims which follow. This invention could also be applied to fixing other types of problems (i.e. non-timing) in a metal-only EC. For instance, if testability or fault tolerance need improvements, violations detected for these criteria could corrected by replacements applied as additional features and advantages are realized through the techniques of the present invention.

These claims should be construed to maintain the proper protection for the invention first described.

What is claimed is:

1. A method performing metal-only engineering changes in a design comprising the steps of:
    making the preliminary design changes in a metal-only process to change the existing design and perform an engineering change only (ECO) place and wire change to ensure that only wire changes can be made to the design, and
    for timing violations, determining which violating books of the existing design are contributing to said timing violations and creating an incumbent list of violating books which are contributing to timing problems of the design because of one or more of: slowness, poor gains, bad slews, and poor location violations and identifying these violating books as incumbent list books,
    determining a replacement book for each violating book by creating a candidate list of replacement books having improved factors because of one or more of: distance, slack, gain and slew from within the existing design, and
    swapping incumbent books with said replacement books of the candidate list to make the best swap for each book swapped from within an existing design with only wire changes to the design to improve a path having the said timing violation after comparing slews, gains, slacks and locations of these swapped books with those of the incumbent list and fixing those on the incumbent list by propagating a new critical timing path to swapped candidate books with a metal only fix which does not break the timing of the path involving incumbent books.

2. The method according to claim 1, where said swapping of books is done using only wire connections.

3. The method according to claim 1, where said determining a replacement book only considers books above a certain gain.

4. The method according to claim 1, where said determining a replacement book chooses the physically nearest and closest book meeting all other criteria.

5. The method according to claim 1, where said determining a replacement book chooses the highest initial slack meeting all other criteria.

6. The method according to claim 1, where said determining a replacement book consists of substituting all possible replacement books for a violating book and choosing the one with the most improvement to the timing violation without causing a worse timing path.

7. A method performing metal-only engineering changes in a design comprising the steps of:
    making the preliminary design changes in a metal-only process to change an existing design and perform an engineering change only (ECO) place and wire change to ensure that only wire changes can be made to the design , and
    exercising the design, and then
    determining if there are violations which occur of the design criteria within the existing design, and
    for said design criteria violations, determining which violating books are contributing to said design criteria violations within the existing design and listing those violating books which are contributing to timing problems of the design because of one or more of: slowness, poor gains, bad slews, and poor location violations as incumbent list books in an incumbent list, and
    determining a replacement book for each violating book by creating a candidate list from within the existing design of replacement books having improved factors because of one or more of: distance, slack, gain and slew, and
    swapping incumbent books with replacement books of the candidate list to make the best swap for each book from within the existing design with only wire changes to the design to improve a path having the said design criteria violation after comparing slews, gains, slacks and locations of these swapped books with those of the incumbent list and fixing those on the incumbent list by propagating a new critical timing path to swapped candidate books with a metal only fix which does not break the timing of the path involving incumbent books.

8. The method according to claim 7, where said swapping of books is done using only wire connections.

9. The method according to claim 7, where said determining a replacement book only considers books above a certain gain.

10. The method according to claim 7, where said determining a replacement book chooses the physically nearest and closest book meeting all other criteria while maintaining a constant silicon base while still having free choice of custom standard unique cells.

11. The method according to claim 7, where said determining a replacement book chooses the highest initial slack meeting all other criteria.

12. The method according to claim 7, where said determining a replacement book consists of substituting all possible replacement books for a violating book and after comparing slews, gains, slack and locations of swapped books with those of an incumbent list choosing the one with the most improvement to the design criteria violation without causing a worse wire path.

* * * * *